(12) United States Patent
Suzuki (10) Patent No.: US 12,337,913 B2
(45) Date of Patent: Jun. 24, 2025

(54) DRIVING CONTROL APPARATUS AND DRIVING CONTROL METHOD

(71) Applicant: ISUZU MOTORS LIMITED, Tokyo (JP)

(72) Inventor: Motoya Suzuki, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 275 days.

(21) Appl. No.: 18/118,628

(22) Filed: Mar. 7, 2023

(65) Prior Publication Data

US 2023/0303163 A1   Sep. 28, 2023

(30) Foreign Application Priority Data

Mar. 23, 2022 (JP) .................... 2022-046360

(51) Int. Cl.
  *B62D 7/15* (2006.01)
  *B62D 6/00* (2006.01)

(52) U.S. Cl.
  CPC ............. *B62D 7/159* (2013.01); *B62D 6/00* (2013.01)

(58) Field of Classification Search
  CPC ......... B62D 6/00; B62D 7/159; B60W 30/02; B60W 30/143; B60W 2530/10
  See application file for complete search history.

(56) References Cited

U.S. PATENT DOCUMENTS

| | | | |
|---|---|---|---|
| 2009/0099717 A1 | 4/2009 | Yabushita et al. | |
| 2023/0104727 A1* | 4/2023 | Oda | B60W 30/146 701/93 |
| 2023/0303163 A1* | 9/2023 | Suzuki | B62D 6/00 |
| 2024/0083496 A1* | 3/2024 | Suzuki | B62D 15/0215 |
| 2024/0158007 A1* | 5/2024 | Suzuki | B62D 6/002 |
| 2024/0174229 A1* | 5/2024 | Suzuki | B60W 30/045 |
| 2024/0182113 A1* | 6/2024 | Suzuki | B62D 15/025 |
| 2024/0190426 A1* | 6/2024 | Suzuki | B60W 30/18145 |

FOREIGN PATENT DOCUMENTS

JP   4297123 B   7/2009

\* cited by examiner

*Primary Examiner* — John Kwon
(74) *Attorney, Agent, or Firm* — PROCOPIO, CORY, HARGREAVES & SAVITCH LLP (57) ABSTRACT

A driving control apparatus includes: a generating part that generates, with a predetermined control period, a vehicle model; and a calculating part that calculates, as an optimal steering angle, a steering angle that minimizes or maximizes an output value of an evaluation function including an estimated lateral deviation, an estimated azimuth deviation, a steering angle, and a change amount of the steering angle from the immediately preceding control period, calculated based on the vehicle model. The calculating part causes the coefficient of the term corresponding to the change amount after an initial period has passed from when the vehicle started to be smaller than the weighting coefficient of the term corresponding to the change amount up to when the predetermined initial period has passed from when the vehicle started.

13 Claims, 6 Drawing Sheets

DRIVING CONTROL APPARATUS AND DRIVING CONTROL METHOD

CROSS-REFERENCE TO RELATED APPLICATIONS

The present application claims priority to Japanese Patent Applications number 2022-046360, filed on Mar. 23, 2022, contents of which are incorporated herein by reference in their entirety.

BACKGROUND OF THE INVENTION

The present invention relates to a driving control apparatus and a driving control method.

Conventionally, a travel control system causing a vehicle to travel along a target trajectory has been known. Japanese Patent No. 4297123 discloses a travel control system that determines a curvature of a target trajectory based on a velocity of a vehicle.

A conventional travel control system calculates a steering angle for a vehicle to travel along a target trajectory, by using a vehicle model in which a weight and a center of gravity position of the vehicle are input in advance as fixed values. However, when the number of passengers or the load weight of the vehicle changes, the weight and the center of gravity position of the vehicle are different from the weight and the center of gravity position of the vehicle input as fixed values in the vehicle model. As a result, since the travel control system cannot calculate the steering angle for traveling along the target trajectory with high accuracy, there is a problem that the vehicle might be unable to travel along the target trajectory.

In order to make a vehicle travel along a target trajectory, it is conceivable to make the vehicle travel with a steering angle that minimizes or maximizes an output value of an evaluation function including an estimated lateral deviation, an estimated azimuth deviation, the steering angle, and a change amount from the steering angle, which are calculated based on a vehicle model. However, when an attempt is made to travel along the target trajectory, the steering angle changes greatly immediately after the vehicle starts moving, and there is a problem that driver feeling (i.e., ride comfort) deteriorates.

BRIEF SUMMARY OF THE INVENTION

The present invention has been made in view of the above circumstances, and an object of the present invention is to make a vehicle travel along a target trajectory and improve driver feeling at the time of starting the vehicle.

A driving control apparatus according to a first aspect of the present invention comprises: an acquiring part that acquires a weight of a vehicle, a center of gravity position of the vehicle, a velocity of the vehicle, a steering angle of the vehicle, a lateral deviation of the vehicle, an azimuth deviation of the vehicle, and a curvature of a road surface on which the vehicle travels; a generating part that generates, with a predetermined control period, a vehicle model indicating a relationship among the weight, the center of gravity position, the velocity, the steering angle, the lateral deviation, the azimuth deviation, and the curvature; and a calculating section that calculates, as an optimal steering angle, a steering angle that minimizes or maximizes an output value of an evaluation function including an estimated lateral deviation, an estimated azimuth deviation, the steering angle, and a change amount of the steering angle from the immediately preceding control period, calculated based on the vehicle model. The calculating section causes a weighting coefficient of a term corresponding to the change amount after an initial period has passed from when the vehicle started to be smaller than the weighting coefficient of the term corresponding to the change amount up to when the predetermined initial period has passed from when the vehicle started.

A driving control method according to a second aspect of the present invention is a driving control method, executed by a computer, comprising: acquiring a weight of a vehicle, a center of gravity position of the vehicle, a velocity of the vehicle, a steering angle of the vehicle, a lateral deviation of the vehicle, an azimuth deviation of the vehicle, and a curvature of a road surface on which the vehicle travels; generating, with a predetermined control period, a vehicle model indicating a relationship among the weight, the center of gravity position, the velocity, the steering angle, the lateral deviation, the azimuth deviation, and the curvature; and calculating, as an optimal steering angle, a steering angle that minimizes or maximizes an output value of an evaluation function including an estimated lateral deviation, an estimated azimuth deviation, the steering angle, and a change amount of the steering angle from the immediately preceding control period, calculated based on the vehicle model. The calculating includes causing a weighting coefficient of a term corresponding to the change amount after an initial period has passed from when the vehicle is started to be smaller than the weighting coefficient of the term corresponding to the change amount up to when the predetermined initial period has passed from the start of the vehicle.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

[Outline of the Driving Control System S]

Figure 1:
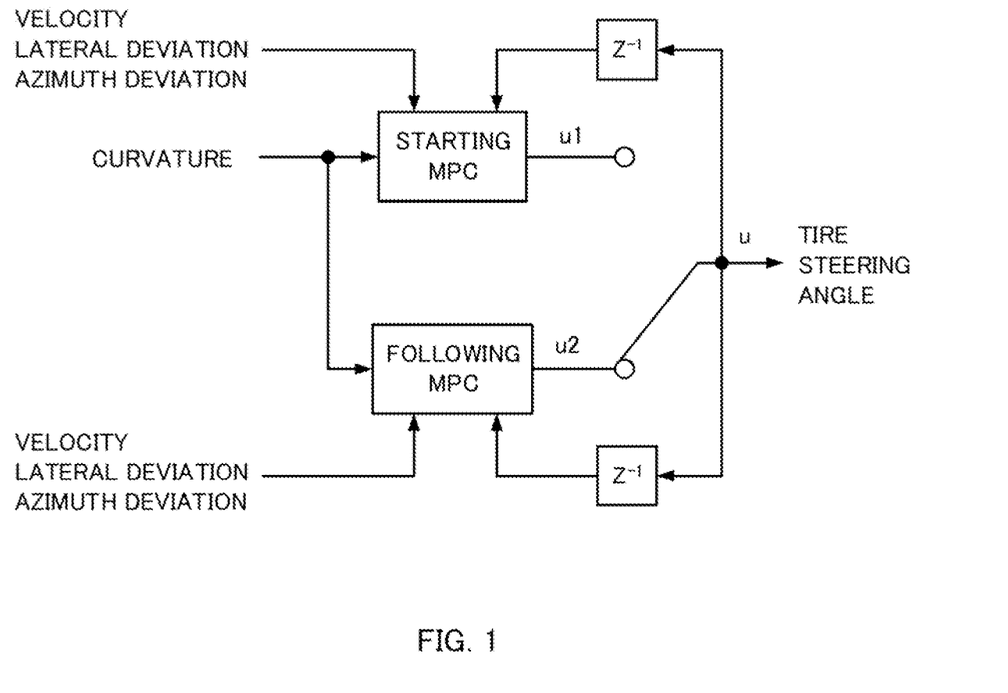
FIG. 1 is a diagram for explaining the main points of a driving control system S.

FIG. 1 is a diagram for explaining the main points of the driving control system S. The driving control system S is a system for causing a vehicle to travel along a target trajectory by controlling a steering angle of the vehicle, and is, for example, a system included in the vehicle. The target trajectory is a predetermined trajectory, and includes a plurality of travel positions that are targets for the vehicle and directions, corresponding to the plurality of travel positions, that are targets for the vehicle.

The driving control system S calculates an optimal tire steering angle u at regular control periods, by model prediction control using a vehicle model indicating a relationship between a traveling velocity (hereinafter referred to as "vehicle velocity") of the vehicle, a lateral deviation, an azimuth deviation, and a curvature of a road surface on which the vehicle travels. The driving control system S has a starting model prediction control section (starting MPC), which is used until a predetermined period of time has passed after the starting of the vehicle, and a following model prediction control section (following MPC), which is used after the predetermined period of time has passed. As an example, the starting MPC and the following MPC calculate a tire steering angle u1 and a tire steering angle u2 in parallel.

The driving control system S uses the tire steering angle u1 calculated by the starting MPC for control of the vehicle until the predetermined period has passed, and uses the tire steering angle u2 calculated by the following MPC for control of the vehicle after the predetermined period has passed. The starting MPC prioritizes driver feeling over following the target trajectory, and determines the tire steering angle u1 such that the amount of change per unit time does not become too large. On the other hand, the tracking MPC prioritizes following the target trajectory, and determines the tire steering angle u2. Since the driving control system S switches between the starting MPC and the following MPC before and after the predetermined period of time has passed since the starting of the vehicle, it is possible to achieve both good driver feeling and following of the target trajectory.

[Configuration of the Drive Control System S]

Figure 2:
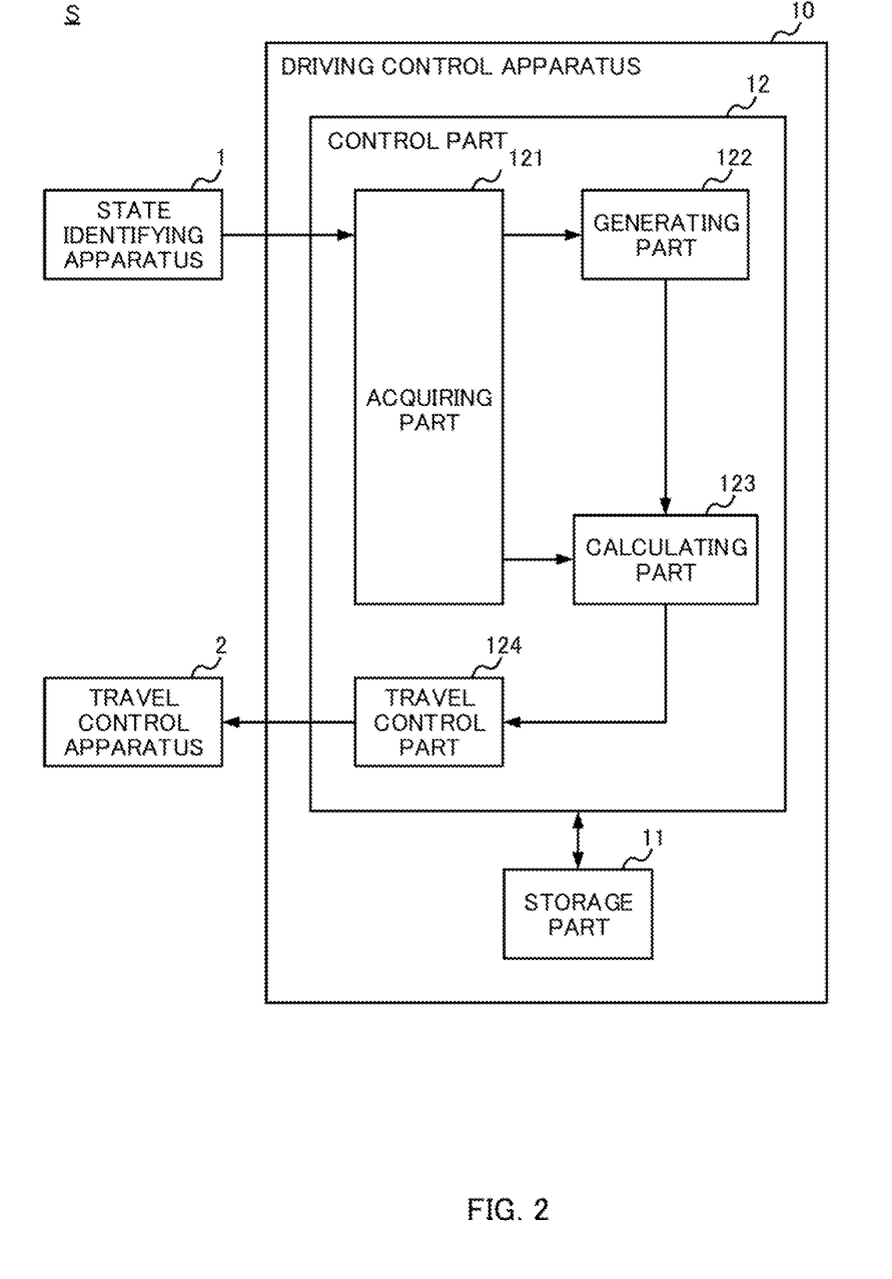
FIG. 2 is a diagram showing a configuration of the driving control system S.

FIG. 2 is a diagram showing a configuration of the driving control system S. The driving control system S includes a state identifying apparatus 1, a travel control apparatus 2, and a driving control apparatus 10.

The state identifying apparatus 1 identifies a parameter indicating the state of the vehicle, at a regular control period. The parameter indicating the state of the vehicle includes, for example, the weight of the vehicle, the position of the center of gravity, the velocity, the steering angle, the lateral deviation, the azimuth deviation, and the curvature of the road surface. The lateral deviation is a difference between a traveling position of the vehicle and a target traveling position of the vehicle, in a direction orthogonal to the traveling direction of the vehicle. The azimuth deviation is a difference between the direction of the vehicle at the position at which the vehicle is travelling and the target direction of the vehicle corresponding to this position.

The state identifying apparatus 1 measures the weight of a person riding in the vehicle and the weight of a load loaded on the vehicle, for example. The state identifying apparatus 1 specifies the weight of the traveling vehicle based on the measured weight of the person and, weight of the load, and weight of the vehicle. The state identifying apparatus 1 identifies the position of the center of gravity position of the vehicle based on the identified weight of the vehicle and the wheel base of the vehicle.

The state identifying apparatus 1 identifies a longitudinal velocity, which is a velocity in a progression direction of the vehicle, and a lateral velocity, which is a velocity in a direction orthogonal to the progression direction of the vehicle, based on, for example, the velocity of the vehicle measured by a velocity sensor (not shown) provided to the vehicle. Furthermore, the state identifying apparatus 1 acquires a steering angle of the vehicle measured by, for example, a steering angle sensor provided to the vehicle. The steering angle acquired by the state identifying apparatus 1 is a rotation angle of a steering wheel shaft, or a difference between the direction of the vehicle and the direction of a tire of the vehicle.

The state identifying apparatus 1 identifies the position and the direction of the vehicle by obtaining a GPS (Global Positioning System) signal, for example. The state identifying apparatus 1 identifies the lateral deviation of the vehicle based on the identified vehicle position and the target travel position for the vehicle corresponding to the position of the vehicle. The state identifying apparatus 1 identifies the azimuth deviation of the vehicle based on the identified direction of the vehicle and the target direction of the vehicle corresponding to the position of the vehicle.

The state identifying apparatus 1 identifies the curvature of the road surface corresponding to the specified position of the vehicle, based on map information stored in a storage part of the state identifying apparatus 1, for example. The state identifying apparatus 1 outputs the identified center of gravity, center of gravity position, longitudinal velocity, lateral velocity, steering angle, lateral deviation, azimuth deviation, and curvature of the road surface to the driving control apparatus 10 at the regular control period.

The travel control apparatus 2 controls the velocity and the direction of the vehicle. The travel control apparatus 2 controls the direction of the vehicle in accordance with the steering angle (hereinafter referred to as a "tire steering angle") at the time of the next control period. The tire steering angles are output by the driving control apparatus 10 at the regular control period.

The driving control apparatus 10 generates, at the regular control period, a vehicle model corresponding to the state of the vehicle input from the state identifying apparatus 1. The driving control apparatus 10 uses the generated vehicle model to calculate the tire steering angle at the regular control period, in order to cause the vehicle to travel in a target direction. The regular control period is a sampling period in the model prediction control. The driving control apparatus 10 inputs the calculated tire steering angle to the travel control apparatus 2, thereby causing the vehicle to travel in the target direction. Hereinafter, the configuration and operation of the driving control apparatus 10 will be described in detail.

[Configuration of the Driving Control Apparatus 10]

The driving control apparatus 10 includes a storage part 11 and a control part 12. The control part 12 includes an acquiring part 121, a generating part 122, a calculating part 123, and a travel control part 124. The driving control apparatus 10 generates the vehicle model based on a parameter indicating a state of the vehicle output from the state identifying apparatus 1, calculates the tire steering angle at the regular control period using an evaluation function corresponding to the generated vehicle model, and outputs the tire steering angle to the travel control apparatus 2.

The storage part 11 includes storage media such as a ROM (Read Only Memory), a RAM (Random Access Memory), and an SSD (Solid State Drive). The storage part 11 stores a program executed by the control part 12. The control part 12 is a CPU (Central Processing Unit), for example. The control part 12 operates as the acquiring part 121, the generating part 122, the calculating part 123, and the travel control part 124 by executing the program stored in the storage part 11.

The acquiring part 121 acquires, at the regular control period, the parameter indicating the state of the vehicle output from the state identifying apparatus 1. The acquiring part 121 acquires the weight of the vehicle, the position of the center of gravity position of the vehicle, the longitudinal velocity that is the velocity in the traveling direction of the vehicle, the lateral velocity that is the velocity in the direction orthogonal to the traveling direction of the vehicle, the steering angle of the vehicle, the lateral deviation of the vehicle, the azimuth deviation that is the difference between the direction of the vehicle at the position where the vehicle is travelling and the target direction of the vehicle corresponding to this position, and the curvature of the road surface on which the vehicle travels.

Figure 3:
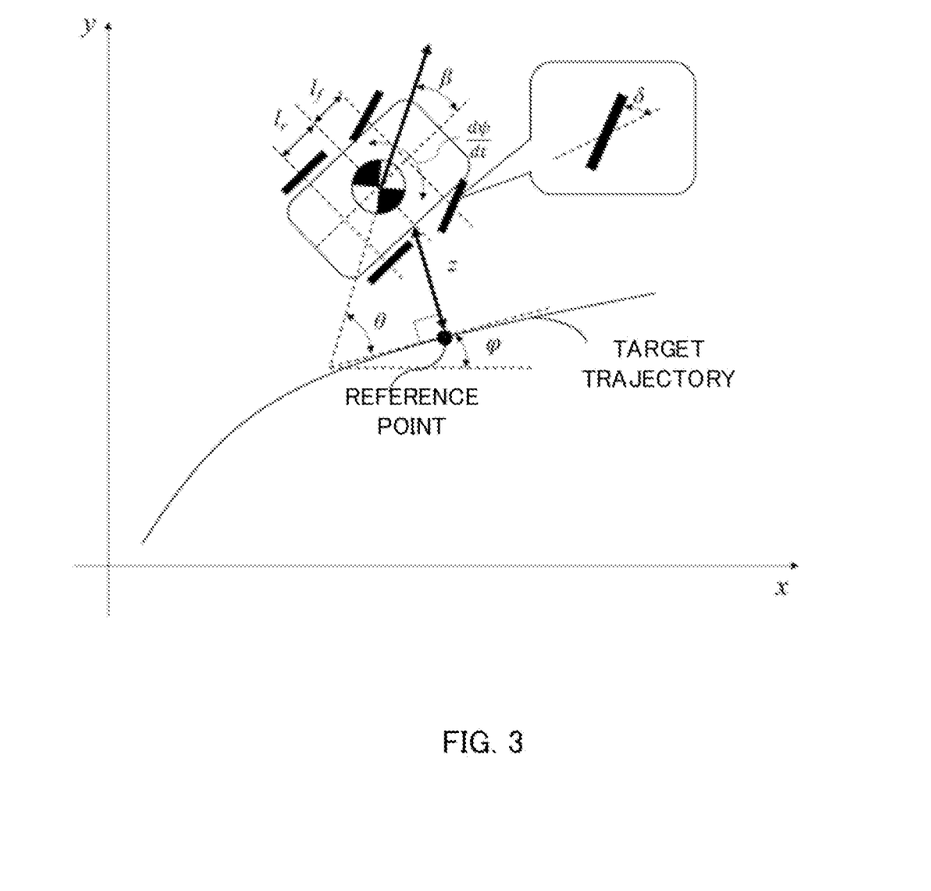
FIG. 3 is a diagram for explaining a vehicle model generated by a generating part 122.

The generating part 122 generates, at the regular control period, the vehicle model indicating the relationship among the weight, the center of gravity position, the velocity, the steering angle, the lateral deviation, the azimuth deviation, and the curvature. FIG. 3 is a diagram for explaining a vehicle model generated by the generating part 122. The generating part 122 generates a vehicle model corresponding to a reference point shown in FIG. 3, for example.

The generating part 122 may generate, in response to the acquiring part 121 acquiring at least one of the weight, the center of gravity position, the longitudinal velocity, and the lateral velocity of the vehicle in a regular control period, a vehicle model corresponding to the timing of the control period subsequent to the control period that corresponds to the timing at which the acquiring part 121 acquired the at least one of the weight, the center of gravity position, the longitudinal velocity, and the lateral velocity. For example, the generating part 122 generates a vehicle model in which at least one of the weight, the center of gravity position, the longitudinal velocity, and the lateral velocity of the vehicle is updated at the regular control period.

The generating part 122 generates a vehicle plant model indicating the motion of the vehicle and a route following model indicating the trajectory of the motion of the vehicle, as a continuous-time vehicle model. Subsequently, the generating part 122 derives a discrete-time state equation from the generated continuous-time vehicle model. In the present embodiment, as an example, the vehicle model is generated using an equivalent two-wheel model.

First, the vehicle plant model will be described. The vehicle motion corresponding to the reference point shown in FIG. 3 can be expressed by the following equations (1) and (2) using the longitudinal velocity vx of the vehicle, the lateral velocity vy of the vehicle, the yaw angle ψ, the vehicle velocity v, and the steering angle input δ.

$$\frac{dv_y(t)}{dt} = a_{11}v_y(t) + \left(-v_x(t) + \frac{a_{12}}{v_x(t)}\right)\frac{d\psi(t)}{dt} + a_{13}\delta(t) \quad (1)$$

$$\frac{d^2\psi(t)}{dt^2} = \frac{a_{21}}{v_x(t)}v_y(t) + \frac{a_{22}}{v_x(t)}\frac{d\psi(t)}{dt} + a_{23}\delta(t) \quad (2)$$

However, assuming that the longitudinal velocity vx of the vehicle is constant and the slip angle is sufficiently small, it is assumed that the following equation (3) holds.

$$vy = v_x \sin(\beta(t)) \approx v_x \beta(t) \quad (3)$$

The coefficients $a_{ij}$(i,j=1, 2, 3) used in the equations (1) and (2) are calculated by the following equations (4) to (9) using the cornering coefficient Kf of the front wheel, the cornering coefficient Kr of the rear wheel, the distance lf from the center of gravity to the front wheel, the distance lr from the center of gravity to the rear wheel, the weight m of the vehicle, and the inertial moment I.

$$a_{11} = -\frac{K_f + K_r}{m} \quad (4)$$

$$a_{12} = \frac{-l_f K_f + l_r K_r}{m} \quad (5)$$

$$a_{13} = \frac{K_f}{m} \quad (6)$$

$$a_{21} = \frac{-l_f K_f + l_r K_r}{I} \quad (7)$$

$$a_{22} = -\frac{l_f^2 K_f + l_r^2 K_r}{I} \quad (8)$$

$$a_{23} = \frac{l_f K_f}{I} \quad (9)$$

The equation for calculating the curvature κ indicating the trajectory along which the vehicle travels is expressed by the following equation (10), based on equations (1) and (2).

$$\kappa(t) = \frac{a_{11}}{v^2(t)}\beta(t) + \frac{a_{12}}{v^3(t)}\frac{d\psi(t)}{dt} + \frac{a_{13}}{v^2(t)}\delta(t) \quad (10)$$

Next, the route following model will be described. When the vehicle plant model is represented by a state space model, the following equations (11) to (14) are obtained.

$$A = \begin{bmatrix} a_{11} & \left(-v_x(t) + \frac{a_{12}}{v_x(t)}\right) \\ \frac{a_{21}}{v_x(t)} & \frac{a_{22}}{v_x(t)} \end{bmatrix} \quad (11)$$

$$B = \begin{bmatrix} a_{13} \\ a_{23} \end{bmatrix} \quad (12)$$

$$x = \begin{bmatrix} v_y(t) \\ \frac{d\psi(t)}{dt} \end{bmatrix} \quad (13)$$

$$\frac{dx(t)}{dt} = Ax(t) + B\delta(t) \quad (14)$$

Assuming that i) a connecting line between the reference point and the vehicle and ii) a tangent of the reference point are orthogonal to each other, the route length Sr is represented by the following equation (15) using the signed distance z that is the distance between the vehicle and the reference point shown in FIG. 3. The signed distance z is represented by the following equation (16).

$$s_r(t) = \int^t \frac{v(\tau)\cos(\theta(\tau))}{1-\kappa_r(\tau)z(\tau)}d\tau \qquad (15)$$

$$z(t) = \int^t v(\tau)\sin(\theta(\tau))dt \qquad (16)$$

The azimuth deviation θ shown in FIG. 3 is calculated by the following equation (17) using the slip angle β, the yaw angle ψ, and the posture angle φ of the reference point.

$$\theta(t)=\psi(t)+\beta(t)-\varphi(s_r) \qquad (17)$$

By substituting the equations (1) and (2) into the equation (12), the generating part 122 can also calculate the azimuth deviation θ using the following equation (18). Further, it is assumed that the following equation (19) holds for the velocity at which the lateral deviation of the vehicle changes and the velocity at which the azimuth deviation of the vehicle changes.

$$\theta(t) = \int^t \left\{\kappa(\tau)v(\tau) - \frac{v(\tau)\cos(\theta(\tau))}{1-\kappa_r(\tau)z(\tau)}\right\}dt \qquad (18)$$

$$\frac{dz(t)}{dt} = -\rho v_x(t) \qquad (19)$$

By re-defining the state equations using the equations (11) to (14) and the equations (17) to (19), the following equations (20) to (25) are established. By using the equations (20) to (25), the generating part 122 can calculate the trajectory along which the vehicle travels based on the curvature and the steering angle.

$$A = \begin{bmatrix} a_{11} & \left(-v_x(t)+\frac{a_{12}}{v_x(t)}\right) & 0 & 0 \\ \frac{a_{21}}{v_x(t)} & \frac{a_{22}}{v_x(t)} & 0 & 0 \\ 1 & 0 & 0 & -v_x(t) \\ 0 & 1 & 0 & 0 \end{bmatrix} \qquad (20)$$

$$B = \begin{bmatrix} a_{13} & 0 \\ a_{23} & 0 \\ 0 & 0 \\ 0 & -v_x(t) \end{bmatrix} \qquad (21)$$

$$C = \begin{bmatrix} 0 & 0 & 1 & 0 \\ 0 & 0 & 0 & 1 \end{bmatrix} \qquad (22)$$

$$u = \begin{bmatrix} \delta(t) \\ \rho \end{bmatrix} \qquad (23)$$

$$x = \begin{bmatrix} v_y(t) \\ \frac{d\psi(t)}{dt} \\ z(t) \\ \theta(t) \end{bmatrix} \qquad (24)$$

$$\frac{dx(t)}{dt} = Ax(t) + Bu(t) \qquad (25)$$

The generating part 122 updates the continuous-time vehicle model by inputting the weight m of the vehicle, the distance if from the center of gravity to the front wheel and the distance lr from the center of gravity to the rear wheel calculated based on the position of the center of gravity position of the vehicle, the longitudinal velocity vx, and the lateral velocity vy into the continuous-time vehicle model generated in the manner described above.

By having the generating part 122 update the vehicle model in this way, the generating part 122 can update the vehicle model in accordance with at least one of the weight of the vehicle, the center of gravity position of the vehicle, and the velocity of the vehicle acquired for each regular control period. As a result, the generating part 122 can generate a vehicle model corresponding to changes in the weight of the vehicle, the center of gravity position of the vehicle, and the velocity of the vehicle without delay.

Next, the generating part 122 derives a discrete-time state equation. The state equations after the discretization are represented by the following equations (26) to (29). T denotes the control period (sampling period).

$$x[k+1]=A_d x[k]+B_d u[k] \qquad (26)$$

$$y[k]=C_d x[k] \qquad (27)$$

$$x[k]=x(kT) \qquad (28)$$

$$u[k]=u(kT) \qquad (29)$$

Since the solution of the continuous-time state equation is the following equation (30), the following equations (31) and (32) can be derived by substituting the equation (30) into the equation (26).

$$x(t)=e^{At}x_0+\int_0^t e^{A(t-\tau)}Bu(\tau)d\tau \qquad (30)$$

$$x((k+1)T)=e^{A(k+1)T}x_0+e^{A(k+1)T}\int_0^{(k+1)T}e^{-A\tau}Bu(\tau)d\tau \qquad (31)$$

$$x(kT)=e^{AkT}x_0+e^{AkT}\int_0^{kT}e^{A\tau}Bu(\tau)d\tau \qquad (32)$$

When the zero-order hold is represented by the following equation (33), the state variable x for each control period can be represented by the following equation (34), by substituting the equation (33) into the equation (32).

$$u(t) = u(kT) = u[k] = \text{constant} \quad (kT \le t < (k+1)T) \qquad (33)$$

$$x((k+1)T) - e^{AT}x(kT) = \qquad (34)$$

$$e^{A(k+1)T}\left[\int_0^{(k+1)T} e^{-A\tau}Bu(\tau)d\tau - \int_0^{kT} e^{-A\tau}Bu(\tau)d\tau\right]$$

Further, the following equation (35) can be derived from the equation (34).

$$x((k+1)T) = e^{AT}x(kT) + e^{A(k+1)T}\int_{kT}^{(k+1)T} e^{-A\tau}Bu(\tau)d\tau \qquad (35)$$

$$= e^{AT}x(kT) + e^{AT}\int_0^T e^{-A\tau}Bu(kT)d\tau$$

$$= e^{AT}x(kT) + \int_0^T e^{-A\lambda}Bu(kT)d\lambda$$

Subsequently, by defining the following equations (36) and (37), the discrete-time state equation can be expressed by the following equation (38).

$$\lambda=T-t \qquad (36)$$

$$t=\tau+kT \qquad (37)$$

$$x[k+1]=e^{AT}x[k]+\int_0^T e^{-A\lambda}d\lambda Bu[k] \qquad (38)$$

By comparing the coefficients of the equation (26) and the equation (38), the coefficient matrix of the state equation can be expressed by the following equations (39) and (40).

$$A_d = e^{AT} \quad (39)$$

$$B_d = \int_0^T e^{-A\lambda} d\lambda B \quad (40)$$

As described above, the discrete-time state space equation is derived from the state equation that is the continuous-time vehicle model, but since the equation (40) is an equation including integration, the equation includes the motion of the vehicle in the past control period. As a result, the vehicle model in the current control period might not be generated with high accuracy. On the other hand, the generating part 122 may derive the following equations (42) and (43) by using the following equation (41) that is established in a matrix exponential function of A and B.

$$\begin{bmatrix} M_{11} & M_{12} \\ 0 & I \end{bmatrix} = e^{\begin{bmatrix} A & B \\ 0 & 0 \end{bmatrix} T} \quad (41)$$

$$A_d = M_{11} \quad (42)$$

$$B_d = M_{12} \quad (43)$$

In this case, the generating part 122 generates the discrete-time vehicle model using the equations (41) to (43). By operating the generating part 122 in this manner, the generating part 122 can generate a discrete-time vehicle model with high accuracy. Further, since the generating part 122 can omit calculation of the motion of the vehicle in the past control period, the calculation time can be shortened. As a result, the generating part 122 can generate a highly accurate vehicle model with the regular control period.

Next, the operation of the calculating part 123 will be described. The calculating part 123 calculates an estimated lateral deviation and an estimated azimuth deviation excluding noise included in the lateral deviation and the azimuth deviation acquired by the acquiring part 121, and calculates a tire steering angle for optimizing an evaluation function including the estimated lateral deviation and the estimated azimuth deviation. The noise is observation noise or system noise, for example, and includes a measurement error included when the state identifying apparatus 1 specifies a lateral deviation or an azimuth deviation.

First, by inputting the steering angle and the curvature acquired by the acquiring part 121 to the state space model corresponding to the vehicle model that corresponds to the longitudinal velocity, lateral velocity, weight, and center of gravity position acquired by the acquiring part 121, the calculating part 123 estimates the noise included in the lateral deviation and the azimuth deviation acquired by the acquiring part 121. The calculating part 123 specifies the estimated lateral deviation and the estimated azimuth deviation excluding the estimated noise. The calculating part 123 calculates the estimated lateral deviation and the estimated azimuth deviation by using a state equation using a linear Kalman filter, for example.

Assuming that the observation noise v and the system noise ω excluded by the calculating part 123 are white noise, the state equations using the linear Kalman filter can be expressed by the following equations (44) and (45).

$$x[k+1] = A_d x[k] + B_d u[k] + w[k] \quad (44)$$

$$y[k] = C_d x[k] + v[k] \quad (45)$$

Subsequently, based on the equations (44) and (45), the calculating part 123 can calculate the priori estimated value xε of the state variable x, as shown in the following equation (46). Further, when a deviation occurs between the priori estimated value xε and the actual state quantity due to the influence of the system noise, the calculating part 123 can correct the priori estimated value xε using the following equation (47). The variable h in Equation (47) is an innovation gain.

$$x_e[k|k-1] = A_d x_e[k-1] + B_d u[k-1] \quad (46)$$

$$x_e[k] = x_e[k|k-1] + h[k](y[k] - C_d x_e[k|k-1]) \quad (47)$$

In Equation (47), when the influence of the observation noise decreases in response to the change of the value of the variable h, the influence of the system noise on the priori estimated value xε increases, and when the influence of the observation noise increases, the influence of the system noise on the priori estimated value xε decreases. On the other hand, the calculating part 123 updates the priori variance and the posteriori variance in order to optimize the variable h. The priori variance can be represented by the following equation (48), and the posteriori variance can be represented by the following equation (50).

$$P[k|k-1] = A_d P[k-1] A_d^T + B_d v[k] A_d^T \quad (48)$$

$$h[k] = \frac{P[k|k-1]C^T}{CP[k|k-1]C^T + w[k]} \quad (49)$$

$$P[k] = (I - h[k]C^T) P[k|k-1] \quad (50)$$

The calculating part 123 optimizes the weights of observation noise and system noise by adjusting the variable h, which is the innovation gain, using the equations (48) to (50). For example, when the weight of the observation noise is increased, the denominator of Equation (49) is increased, whereby the innovation gain is reduced. On the other hand, when the weight of the system noise is increased, the numerator of Equation (49) is increased, whereby the innovation gain is increased.

Since the state matrices Ad and Bd are defined as time-invariant, if the observation noise and the system noise are white noise, it is considered that the state variable x of the linear time-invariant state equation with infinite time converges to a steady value. Since the calculating part 123 identifies the observation noise and the system noise by optimizing the weights of the observation noise and the system noise, and calculates the estimated lateral deviation and the estimated azimuth deviation excluding the observation noise and the system noise, the driving control apparatus 10 can calculate the tire steering angle with high accuracy based on the estimated lateral deviation and the estimated azimuth deviation.

The calculating part 123 calculates, as the optimal steering angle, a steering angle that minimizes or maximizes the output value of the evaluation function including the estimated lateral deviation, the estimated azimuth deviation, the steering angle, and the change amount of the steering angle from the immediately preceding control period, calculated based on the vehicle model. Specifically, the calculating part 123 first inputs the calculated estimated lateral deviation and estimated azimuth deviation, the steering angle, and the change amount of the steering angle to the evaluation function corresponding to the vehicle model corresponding to the longitudinal velocity, lateral velocity, weight, and center of gravity position acquired by the acquiring part 121. Then, the calculating part 123 calculates a tire steering angle for minimizing or maximizing the output value of the evaluation function.

Here, when the state variable x of the state space equation is represented by the following equation (51), an observed output y is represented by equation (52). Here, $v_y$, $\psi$, $e_z$, and $e_\theta$ are the lateral velocity, the yaw rate, the estimated lateral deviation, and the estimated azimuth deviation, respectively.

$$x = \begin{bmatrix} v_y \\ \psi \\ e_z \\ e_\theta \end{bmatrix} \quad (51)$$

$$y = \begin{bmatrix} e_z \\ e_\theta \end{bmatrix} \quad (52)$$

The calculating part 123 estimates the state variable x using a steady state Kalman filter, and calculates the optimization problem of the model prediction control using the evaluation function shown in the following equation (53). In Equation (53), p denotes a predicted horizon, $\delta$ denotes a steering angle input, $\Delta\delta$ denotes a difference between the steering angle input and the steering angle input of the immediately preceding control period, and "max" and "min", which are suffixes of the input and output variables, denote upper and lower limit values of the signal. $Q_1$, $Q_2$, $R_1$, and $R_2$ are weighting factors.

$$J = \int_t^{t+t_p} \{Q_1 e_z^2 + Q_2 e_\theta^2 + R_1 \delta^2 + R_2 \Delta\delta^2\} d\tau \quad (53)$$

$$\text{subject to} \quad \delta_{min} \leq \delta[k+k_t] \leq \delta_{max}$$

$$\Delta\delta_{min} \leq \Delta\delta[k+k_t] \leq \Delta\delta_{max}$$

The calculating part 123 performs the optimization calculation for minimizing the output value J of the evaluation function shown in the equation (53) to calculate the tire steering angle in real time, thereby achieving following of the target trajectory of the vehicle. By calculating the tire steering angle with the calculating part 123 in this way, the driving control apparatus 10 can cause the vehicle to travel at a position where the error with respect to the target trajectory is small at the timing of each of a plurality of control periods.

The travel control part 124 causes the vehicle to travel based on the tire steering angle calculated by the calculating part 123. The travel control part 124 outputs the tire steering angle calculated by the calculating part 123 to the travel control apparatus 2 at the regular control period, thereby causing the vehicle to travel at the calculated tire steering angle.

Here, as an example, in a case where priority is given to converging the lateral deviation and the azimuth deviation to 0, the calculating part 123 sets at least one of the weighting coefficients $Q_1$ and $Q_2$ to be larger and sets at least one of the weighting coefficients $R_1$ and $R_2$ to be smaller, compared to a case where priority is not given to converging the lateral deviation and the azimuth deviation to 0. When priority is given to reducing the change amount of the tire steering angle, the calculating part 123 sets $R_2$ to be larger than when priority is given to reducing the change amount of the tire steering angle.

In order to improve the driver feeling immediately after the start of the vehicle and to secure the ability of the vehicle to follow the target trajectory, the calculating part 123 causes the weighting coefficient $R_1$ (steering angle coefficient) after an initial period has passed from the start of the vehicle to be smaller than the weighting coefficient $R_1$ of the term corresponding to the tire steering angle $\delta$ up to when the initial period has passed. In addition, the calculating part 123 causes the weighting coefficient $R_2$ (steering angle variation coefficient) after the initial period has passed from the start of the vehicle to be smaller than the weighting coefficient $R_2$ of the term corresponding to the variation $\Delta\delta$ of the tire steering angle up to when the initial period has passed.

The calculating part 123 may cause the weighting coefficient Q1 (lateral deviation coefficient) after the initial period has passed from when the vehicle started to be larger than the weighting coefficient $Q_1$ of the term corresponding to the estimated lateral deviation $e_z$ up to when the initial period has passed. In addition, the calculating part 123 may cause the weighting coefficient $Q_2$ (azimuth deviation coefficient) after the initial period has passed from the start of the vehicle to be larger than the weighting coefficient $Q_2$ of the term corresponding to the estimated azimuth deviation $e_\theta$ up to when the initial period has passed.

Specifically, the calculating part 123 causes the weighting coefficients $Q_1$ and $Q_2$ to be smaller before the initial period has passed than after the initial period has passed and causes the weighting coefficients $R_1$ and $R_2$ to be larger before the initial period has passed than after the initial period has passed, thereby suppressing an excessive increase in the tire steering angle or an excessive increase in the amount of change in the tire steering angle, resulting in an improvement of the driver feeling. On the other hand, after the initial period has passed, the calculating part 123 increases the weighting coefficients $Q_1$ and $Q_2$ and decreases the weighting coefficients $R_1$ and $R_2$, thereby giving priority to reducing the lateral deviation and the azimuth deviation and improving the ability to follow the target trajectory.

In accordance with a mode set by the driver, the calculating part 123 may determine a value of each weighting coefficient up to when the initial period has passed and a value of each weighting coefficient after the initial period has passed. For example, when the driver selects a mode which gives priority to the driver feeling over the ability to follow the target trajectory immediately after the vehicle starts, the calculating part 123 causes the weighting coefficients $R_1$ and $R_2$ up to when the initial period has passed to be larger than in a case where the driver selects a mode which gives priority to the ability to follow the target trajectory immediately after the start of the vehicle.

Incidentally, if a weighting coefficient is changed only at the timing at which the initial period has passed, there is a possibility that the driver feeling will rapidly change. Therefore, the calculating part 123 may change the weighting coefficient over a predetermined transition period after the initial period has passed. The predetermined transition period is determined based on the magnitude of the difference between the weighting coefficient before the change and the weighting coefficient after the change, for example, and is a period required for slowly changing the weighting coefficient to an extent whereby the driver does not easily notice the change of the weighting coefficient.

Further, since characteristics are different depending on the vehicle type, the optimum weighting coefficient in the evaluation function is different. Accordingly, the calculating part 123 may identify the type of vehicle based on vehicle identification information stored in the storage part 11, for example, and the calculating part 123 may determine at least one of the weighting coefficients of one or more terms of the evaluation function by referencing the storage part 11 that stores the vehicle type in association with the weighting coefficients of one or more terms of the evaluation function. Since the calculating part 123 is configured in this manner, the control part 12 can control the vehicle using weighting coefficients suitable for each of a plurality of vehicle types by executing one program.

[Flowchart of the Driving Control Apparatus 10]

Figure 4:
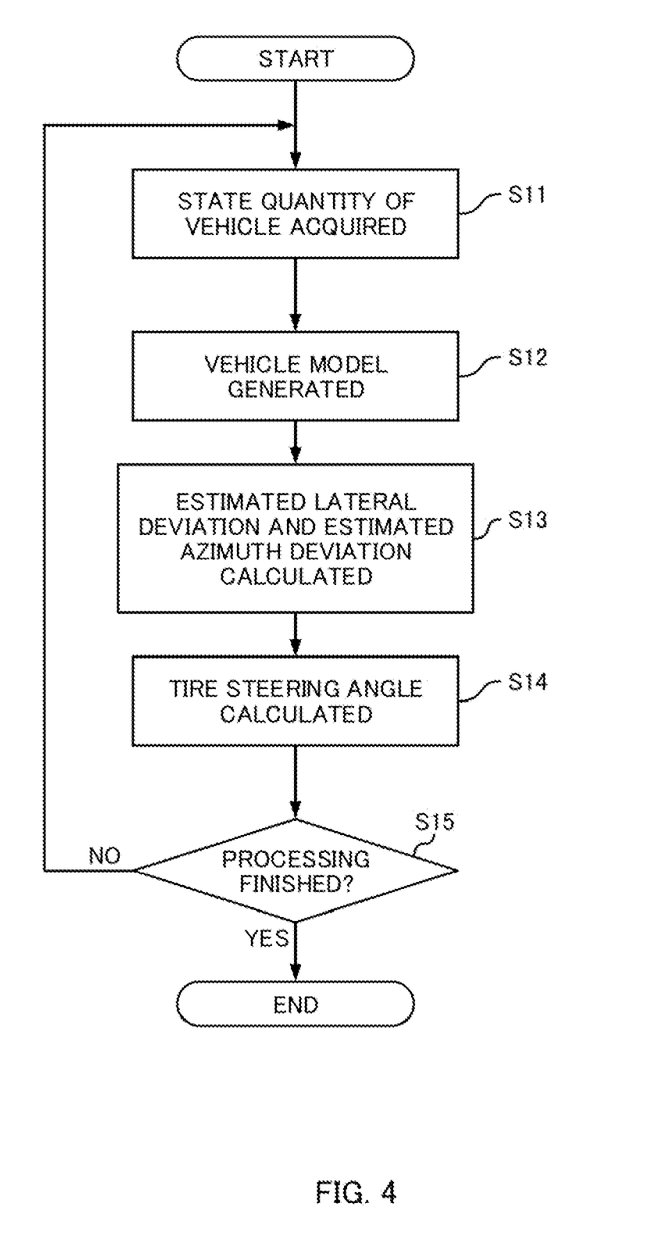
FIG. 4 is a flowchart showing an example of the operation of a driving control apparatus 10.

FIG. 4 is a flowchart showing an example of the operation of the driving control apparatus 10. The flowchart shown in FIG. 4 shows the operation in which the driving control apparatus 10 calculates the tire steering angle based on the parameter indicating the state of the vehicle acquired from the state identifying apparatus 1.

The acquiring part 121 acquires a state quantity of the vehicle, such as the weight of the vehicle, the center of gravity position of the vehicle, the longitudinal velocity of the vehicle, the lateral velocity of the vehicle, the steering angle of the vehicle, the lateral deviation of the vehicle, the azimuth deviation of the vehicle, and the curvature of the road surface on which the vehicle travels (S11). The generating part 122 generates a vehicle model corresponding to the state quantity of the vehicle acquired by the acquiring part 121 (S12).

By inputting the steering angle of the vehicle and the curvature of the road surface on which the vehicle runs, acquired by the acquiring part 121, into the state space model corresponding to the vehicle model generated by the generating part 122, the calculating part 123 calculates the estimated lateral deviation and the estimated azimuth deviation excluding the observation noise and the system noise included in the lateral deviation of the vehicle and the azimuth deviation of the vehicle acquired by the acquiring part 121 (S13).

The calculating part 123 inputs the curvature acquired by the acquiring part 121 and the estimated lateral deviation and estimated azimuth deviation identified by the calculating part 123 to the evaluation function corresponding to the vehicle model generated by the generating part 122, and calculates a tire steering angle for minimizing the output value of the evaluation function (S14).

If the operation of ending the process is not performed (NO in S15), the driving control apparatus 10 repeats the processing from S11 to S14 in order to calculate the tire steering angle based on the parameter indicating the state of the vehicle acquired at the time of the next control period. If the operation of ending the process is performed (YES in S15), the driving control apparatus 10 ends the process.

Figure 5:
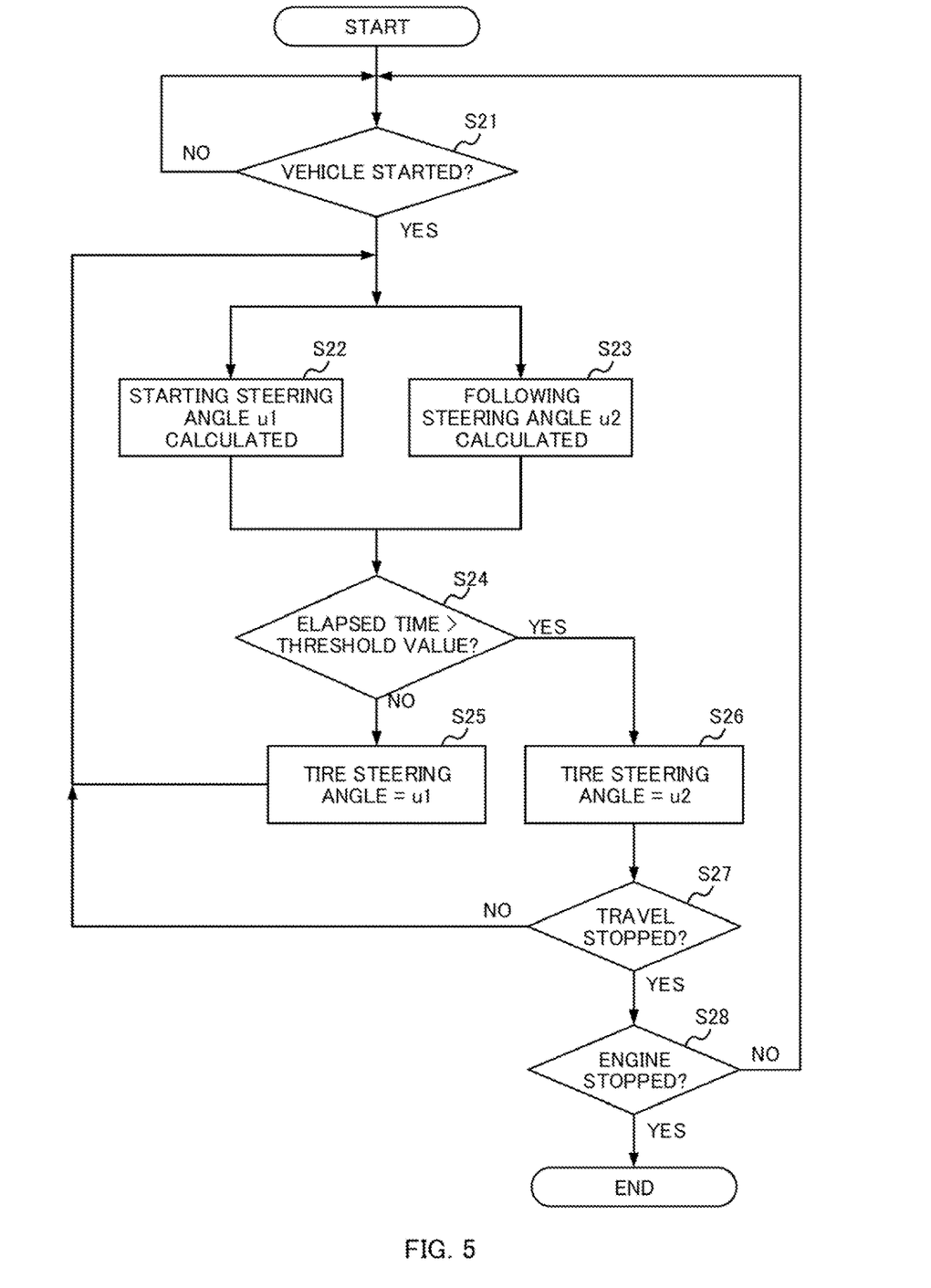
FIG. 5 is a flowchart of a process of determining a steering angle.

FIG. 5 is a flowchart showing an example of an operation in which the calculating part 123 calculates a tire steering angle. The flowchart shown in FIG. 5 begins with a process of monitoring whether or not the vehicle has started (S21).

If it is determined that the vehicle has started (YES in S21), the calculating part 123 sequentially executes the calculation of the starting steering angle u1 (S22) and the calculation of the following steering angle u2 (S23) for each control period. The order of these processes within the control period is arbitrary, and the calculating part 123 may perform these processes in parallel using a plurality of processors.

When calculating the starting steering angle u1 and the following steering angle u2, the calculating part 123 determines whether or not the elapsed time from the starting of the vehicle has exceeded a threshold value (S24). If the elapsed time is less than the threshold value (NO in S24), the calculating part 123 selects the starting steering angle u1 as the tire steering angle u (S25), and then returns the processing to S22.

If the elapsed time exceeds the threshold value (YES in S24), the calculating part 123 selects the following steering angle u2 as the tire steering angle u (S26), and then determines whether or not the vehicle has stopped traveling (S27). If it is determined that the vehicle has not stopped traveling (NO in S27), the calculating part 123 returns the processing to S22. If it is determined that the vehicle has stopped traveling (YES in S27), the calculating part 123 determines whether or not the engine is stopped (S28). If the calculating part 123 determines that the engine is not stopped (NO in S28), the calculating part 123 returns the processing to S21.

[Confirmation of Effect through Simulation]

Figure 6:
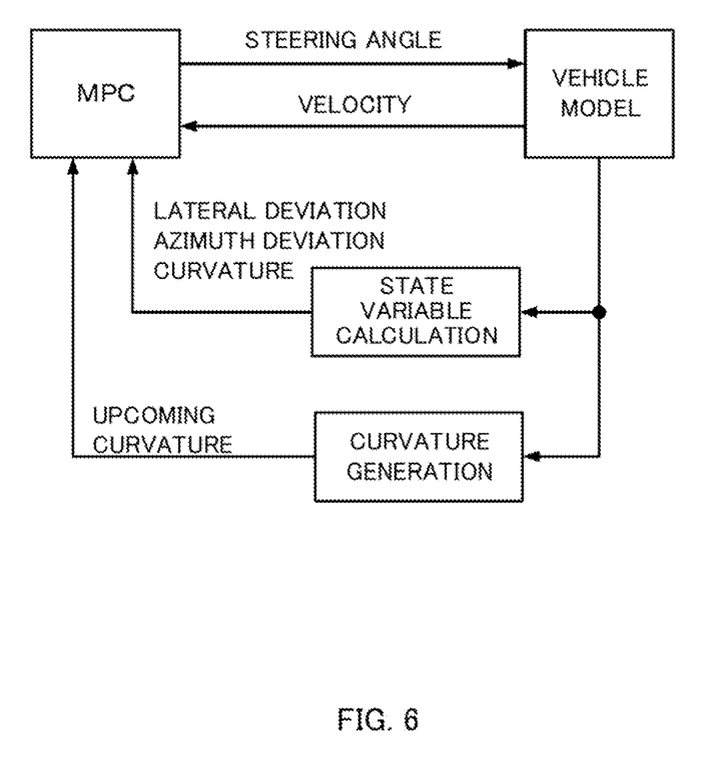
FIG. 6 is a block diagram of a simulation.

The inventor confirmed the effect of the driving control apparatus 10 according to the present embodiment through simulation. FIG. 6 is a block diagram of a simulation.

A computer was used to calculate an estimated lateral deviation, an estimated azimuth deviation, and a curvature using a vehicle model prepared in advance, to calculate an upcoming curvature based on a map model, and to perform an optimization calculation based on an evaluation function to calculate a tire steering angle. At the time of starting, the weighting coefficient $Q_1$ was set to 23.25, the weighting coefficient $Q_2$ was set to 7.5, the weighting coefficient $R_1$ was set to 200, and the weighting coefficient $R_2$ was set to 200, and at the time of following, the weighting coefficient $Q_1$ was set to 23.25, the weighting coefficient $Q_2$ was set to 7.5, the weighting coefficient $R_1$ was set to 4, and the weighting coefficient $R_2$ was set to 75. The initial value of the lateral deviation of the vehicle was set to 1 m, and the initial value of the azimuth deviation and the vehicle velocity were set to 0. Then, verification was performed concerning whether or not the vehicle was able to be started smoothly from this state.

When the weighting coefficients for following were used from the time of starting the vehicle, since the vehicle operated such that the lateral deviation became 0.1 m or less, overshoot occurred with respect to the target trajectory, and the vehicle travelled off course. On the other hand, when the weighting coefficients at the starting of the vehicle were used until 5 seconds passed from the start of the vehicle, the vehicle gradually converged toward the target trajectory and was able proceed along the target trajectory. After that, switching to the weighting coefficients at the time of following was performed, after which it was confirmed that the vehicle travelled along the target trajectory.

[Effects of the Driving Control Apparatus 10]

As described above, the calculating part 123 of the driving control apparatus 10 calculates, as the optimal tire steering angle, the steering angle that minimizes or maximizes the output value of the evaluation function including the estimated lateral deviation calculated, the estimated azimuth deviation, the steering angle, and the change amount of the steering angle from the immediately preceding control period, based on the vehicle model. Then, the calculating part 123 switches the weighting coefficients of the evaluation function according to whether it is currently within the predetermined initial period from the start of the vehicle or whether the predetermined initial period has passed. For example, the calculating part 123 causes the weighting coefficient of the term corresponding to the change amount of the steering angle after the initial period has passed from the start of the vehicle to be smaller than the weighting coefficient of the term corresponding to the change amount of the steering angle up to when the initial period has passed. By operating the calculating part 123 in this manner, it is possible to achieve both an improvement of the driver feeling immediately after the start of the vehicle and the ability to follow after the initial period has passed from the start of the vehicle.

Although the embodiments of the present invention have been described above, the technical scope of the present invention is not limited to the embodiments described above, and various modifications and changes can be made without departing from the scope of the present invention. For example, all or a portion of the device may be functionally or physically distributed and integrated in arbitrary units. Further, new embodiments resulting from arbitrary combinations of a plurality of embodiments are also included in the embodiments of the present invention. The effect of the new embodiment caused by the combination has the effect of the original embodiment.

What is claimed is:

1. A driving control apparatus comprising:
an acquiring part that acquires a weight of a vehicle, a center of gravity position of the vehicle, a velocity of the vehicle, a steering angle of the vehicle, a lateral deviation of the vehicle, an azimuth deviation of the vehicle, and a curvature of a road surface on which the vehicle travels;
a generating part that generates, with a predetermined control period, a vehicle model indicating a relationship among the weight, the center of gravity position, the velocity, the steering angle, the lateral deviation, the azimuth deviation, and the curvature; and
a calculating section that calculates, as an optimal steering angle, a steering angle that minimizes or maximizes an output value of an evaluation function including an estimated lateral deviation, an estimated azimuth deviation, the steering angle, and a change amount of the steering angle from the immediately preceding control period, calculated based on the vehicle model, wherein
the calculating section causes a weighting coefficient of a term corresponding to the change amount after an initial period has passed from when the vehicle started to be smaller than the weighting coefficient of the term corresponding to the change amount up to when the predetermined initial period has passed from when the vehicle started.

2. The driving control apparatus according to claim 1, wherein
the calculating part causes the weighting coefficient of the term corresponding to the steering angle after the initial period has passed from when the vehicle started to be smaller than the weighting coefficient of the term corresponding to the steering angle up to when the predetermined initial period has passed from when the vehicle started.

3. The driving control apparatus according to claim 1, wherein
the calculating part changes the weighting coefficient of the term corresponding to the change amount over a predetermined transition period from the when the initial period has passed.

4. The driving control apparatus according to claim 3, wherein
the calculating part determines the transition period based on a magnitude of a difference between the weighting coefficient before the change and the weighting coefficient after the change.

5. The driving control apparatus according to claim 1, wherein
the calculating part causes a weighting coefficient of a term corresponding to the estimated lateral deviation after the initial period has passed from when the vehicle started to be larger than the weighting coefficient of the term corresponding to the estimated lateral deviation up to when the predetermined initial period has passed.

6. The driving control apparatus according to claim 1, wherein
the calculating part causes a weighting coefficient of a term corresponding to the estimated azimuth deviation after the initial period has passed from when the vehicle started to be larger than the weighting coefficient of the term corresponding to the estimated azimuth deviation up to when the predetermined initial period has passed.

7. The driving control apparatus according to claim 1, wherein
the calculating part determines at least one weighting coefficient of one or more terms of the evaluation function by referencing a storage part that stores a type of the vehicle in association with weighting coefficients of one or more terms of the evaluation function.

8. The driving control apparatus according to claim 1, wherein
when a mode for giving priority to a good feeling over an ability to follow a target trajectory immediately after the vehicle is started is selected, the calculating part causes the weighting coefficient, up to when the initial period has passed, of the term related to the steering angle input to the evaluation function to be larger than in a case where a mode for giving priority to the ability to follow the target trajectory immediately after the vehicle is started is selected.

9. The driving control apparatus according to claim 1, wherein
the calculating part performs an optimization calculation for minimizing the output value of the evaluation function shown in the following equation, where p denotes a predicted horizon, $e_z$ denotes an estimated lateral deviation, $e_\theta$ denotes an estimated azimuth deviation, $\delta$ denotes a steering angle input, $\Delta\delta$ denotes a difference between the steering angle input and the steering angle input of an immediately preceding control period, "max" and "min", which are subscripts of each input and output variable, are upper and lower limit values of a signal, and $Q_1$, $Q_2$, $R_1$, and $R_2$ are weighting coefficients $$J = \int_{t}^{t+t_p} \{Q_1 e_z^2 + Q_2 e_\theta^2 + R_1 \delta^2 + R_2 \Delta\delta^2\} d\tau$$

$$\text{subject to } \delta_{min} \le \delta[k + k_t] \le \delta_{max}$$
$$\Delta\delta_{min} \le \Delta\delta[k + k_t] \le \Delta\delta_{max}.$$

10. The driving control apparatus according to claim 9, wherein
when a mode for giving priority to a good feeling over an ability to follow a target trajectory immediately after the vehicle is started is selected, the calculating part causes the weighting coefficients $R_1$ and $R_2$ in the evaluation function up to when the initial period has passed to be larger than in a case where a mode for giving priority to an ability to follow a target trajectory immediately after the vehicle is started is selected.

11. The driving control apparatus according to claim 9, wherein
in a case where priority is given to converging the lateral deviation and the azimuth deviation to 0, the calculating part sets at least one of the weighting coefficient $Q_1$ and the weighting coefficient $Q_2$ to be larger or sets at least one of the weighting coefficient $R_1$ and the weighting coefficient $R_2$ to be smaller, in comparison to a case where priority is given to converging the lateral deviation and the azimuth deviation to 0.

12. The driving control apparatus according to claim 9, wherein
when priority is given to reducing the change amount of the tire steering angle, the calculating part sets the weighting coefficient $R_2$ to be larger than when priority is not given to reducing the change amount of the tire steering angle.

13. A driving control method, executed by a computer, comprising:
acquiring a weight of a vehicle, a center of gravity position of the vehicle, a velocity of the vehicle, a steering angle of the vehicle, a lateral deviation of the vehicle, an azimuth deviation of the vehicle, and a curvature of a road surface on which the vehicle travels;

generating, with a predetermined control period, a vehicle model indicating a relationship among the weight, the center of gravity position, the velocity, the steering angle, the lateral deviation, the azimuth deviation, and the curvature; and calculating, as an optimal steering angle, a steering angle that minimizes or maximizes an output value of an evaluation function including an estimated lateral deviation, an estimated azimuth deviation, the steering angle, and a change amount of the steering angle from the immediately preceding control period, calculated based on the vehicle model, wherein the calculating includes causing a weighting coefficient of a term corresponding to the change amount after an initial period has passed from when the vehicle is started to be smaller than the weighting coefficient of the term corresponding to the change amount up to when the predetermined initial period has passed from the start of the vehicle.

* * * * *